(12) United States Patent
Zuo

(10) Patent No.: US 10,075,739 B2
(45) Date of Patent: Sep. 11, 2018

(54) INFORMATION RELEASE METHOD, APPARATUS, AND SYSTEM

(71) Applicant: TENCENT TECHNOLOGY (SHENZHEN) COMPANY LIMITED, Shenzhen (CN)

(72) Inventor: Hongtao Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/198,888

(22) Filed: Jun. 30, 2016

(65) Prior Publication Data

US 2016/0316230 A1    Oct. 27, 2016

Related U.S. Application Data

(63) Continuation of application No. PCT/CN2015/073092, filed on Feb. 15, 2015.

(30) Foreign Application Priority Data

Feb. 19, 2014  (CN) .......................... 2014-10056770

(51) Int. Cl.
*H04N 21/2187* (2011.01)
*H04N 21/4788* (2011.01)
(Continued)

(52) U.S. Cl.
CPC ..... *H04N 21/2187* (2013.01); *H04N 21/4312* (2013.01); *H04N 21/4788* (2013.01); *H04N 21/8106* (2013.01)

(58) Field of Classification Search
CPC ........... H04N 21/2187; H04N 21/4312; H04N 21/4788; H04N 21/8106
See application file for complete search history.

(56) References Cited

U.S. PATENT DOCUMENTS

| 8,832,193 B1 * | 9/2014 | Lindberg | H04L 65/60 |
| | | | 348/14.12 |
| 2005/0262542 A1 * | 11/2005 | DeWeese | H04L 12/1818 |
| | | | 725/106 |

(Continued)

FOREIGN PATENT DOCUMENTS

| CN | 101127875 A | 2/2008 |
| CN | 101127880 A | 2/2008 |

(Continued)

OTHER PUBLICATIONS

The World Intellectual Property Organization (WIPO) International Search Report for PCT/CN2015/073092 dated May 25, 2015, p. 1-5.

(Continued)

*Primary Examiner* — Benjamin R Bruckart
*Assistant Examiner* — Aklil M Tesfaye
(74) *Attorney, Agent, or Firm* — Anova Law Group, PLLC

(57) ABSTRACT

The present disclosure discloses an information release method, apparatus, and system, and relates to the field of Internet technologies. The method includes: receiving, by a server, a release request sent by a first terminal that is playing a live video, where the release request carries audio information; determining, by the server, at least one second terminal that is currently playing the live video; and sending, by the server, a release notification that carries the audio information to the second terminal. The present disclosure can reduce an impact on acquisition of information in a live video.

20 Claims, 6 Drawing Sheets

(51) Int. Cl.
*H04N 21/431* (2011.01)
*H04N 21/81* (2011.01)

(56) References Cited

U.S. PATENT DOCUMENTS

| | | | | |
|---|---|---|---|---|
| 2007/0006093 | A1* | 1/2007 | Day | G06F 9/4443 715/781 |
| 2007/0250880 | A1* | 10/2007 | Hainline | H04N 7/173 18 725/97 |
| 2012/0174157 | A1* | 7/2012 | Stinson, III | H04N 5/44543 725/40 |
| 2012/0321271 | A1* | 12/2012 | Baldwin | H04N 9/8715 386/201 |
| 2014/0267578 | A1* | 9/2014 | Rowe | H04N 7/15 348/14.11 |

FOREIGN PATENT DOCUMENTS

| | | |
|---|---|---|
| CN | 101527816 A | 9/2009 |
| CN | 201657190 U | 11/2010 |
| CN | 101916417 A | 12/2010 |
| CN | 201869316 A | 6/2011 |
| CN | 102750335 A | 10/2012 |
| CN | 102752710 A | 10/2012 |
| CN | 102971762 A | 3/2013 |
| CN | 102981761 A | 3/2013 |
| CN | 103368984 A | 10/2013 |
| CN | 103581700 A | 2/2014 |
| EP | 1691556 A2 | 8/2006 |
| WO | 2012155445 A1 | 11/2012 |

OTHER PUBLICATIONS

The State Intellectual Property Office of the People's Republic of China (SIPO) Office Action 1 for 201410056770.8 dated May 3, 2017 pp. 1-12.

The State Intellectual Property Office of the People's Republic of China (SIPO) office Action 1 for 201410056770.8 dated Feb. 2, 2018 12 Pages (including translation).

* cited by examiner

INFORMATION RELEASE METHOD, APPARATUS, AND SYSTEM

CROSS-REFERENCES TO RELATED APPLICATIONS

This application is a continuation application of PCT Patent Application No. PCT/CN2015/073092, filed on Feb. 15, 2015, which claims priority to Chinese Patent Application No. 201410056770.8, entitled "INFORMATION RELEASE METHOD, APPARATUS AND SYSTEM" filed on Feb. 19, 2014, the entire contents of both of which are incorporated herein by reference

FIELD OF THE TECHNOLOGY

The present disclosure relates to the field of Internet technologies, and in particular, to an information release method, apparatus, and system.

BACKGROUND OF THE DISCLOSURE

With the rapid development of network technologies, network bandwidth increasingly grows, and various big data stream services (such as a big data download service, and a live video service) are widely applied, especially the live video service. A live video refers to a video that is synchronously transmitted and played to multiple terminals in a network in a specific period of time, such as a network television, or network live broadcast.

In a process of playing a live video by using a terminal, a user can input and release, in an information window of a live video interface, information in the form of a text and to be released by the user, such as comment information, or mood information, and also can browse information released by others.

During an implementation of the present disclosure, inventors of the present disclosure find that the prior art at least has the following problem:

During viewing of a live video, if a user wants to read information released in an information window, the user needs to move a line of sight to the information window for a period of time; in this way, the user may miss information in the live video in this period of time, which affects acquisition of information in the live video.

SUMMARY

To solve the problem of the prior art, embodiments of the present invention provide an information release method, apparatus, and system, so as to reduce an impact on acquisition of information in a live video. Technical solutions are as follows:

According to a first aspect, an information release method is provided, including: receiving, by a server, a release request sent by a first terminal that is playing a live video, the release request carrying audio information; determining, by the server, at least one second terminal that is currently playing the live video; and sending, by the server, a release notification that carries the audio information to the at least one second terminal.

According to a second aspect, an information release method is provided, including: receiving, by a second terminal, a release notification that carries audio information and is sent by a server; displaying, by the second terminal on an interface of a live video, a play icon of the audio information; and playing, by the second terminal, the audio information when the play icon is selected.

According to a third aspect, an information release method is provided, including: automatically collecting, by a first terminal that is playing a live video, a sound made by a user, to generate audio information; and sending, by the first terminal, a release request that carries the audio information to a server.

According to a fourth aspect, a server is provided, including at least one processor for executing a plurality of program modules including: a receiving module, configured to receive a release request sent by a first terminal that is playing a live video, the release request carrying audio information; a determining module, configured to determine at least one second terminal that is currently playing the live video; and a sending module, configured to send a release notification that carries the audio information to the second terminal.

According to a fifth aspect, a second terminal is provided, including: a receiving module, configured to receive a release notification that carries audio information and is sent by a server; a display module, configured to display on an interface of the live video, a play icon of the audio information; and a playback module, configured to play the audio information when receiving an instruction for clicking the play icon.

According to a sixth aspect, a first terminal is provided, including: an acquisition module, configured to automatically collect, when the first terminal plays a live video, a sound made by a user, to generate audio information; and a sending module, configured to send a release request that carries the audio information to a server.

According to a seventh aspect, an information release system is provided, including a server, a first terminal, and at least one second terminal, the first terminal being configured to acquire audio information when a live video is played; and send a release request that carries the audio information to the server; the server being configured to receive a release request sent by the first terminal that is playing a live video, the release request carrying audio information; determine the at least one second terminal that is currently playing the live video; and send a release notification that carries the audio information to the second terminal; and the second terminal being configured to receive the release notification that carries the audio information and is sent by the server; and play the audio information.

The technical solutions provided by the embodiments of the present invention have the following beneficial effects.

In the embodiments of the present invention, a server receives a release request that carries audio information and is sent by a first terminal that is playing a live video, determines a second terminal that is currently playing the live video, and sends a release notification that carries the audio information to the second terminal; and the second terminal plays the audio information. In this way, during play of a live video, information to be released by a user can be transmitted and released in an audio playback manner, and the user does not need to move a line of sight to read text information in an information window, thereby reducing an impact on acquisition of information in the live video.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objective, technical solutions, and advantages of the present disclosure clearer, the following further describes the embodiments of the present invention in detail with reference to the accompanying drawings.

Embodiment 1

An embodiment of the present invention provides an information release method, where the method may be jointly implemented by a server, an information sender, and an information receiver.

Figure 1:
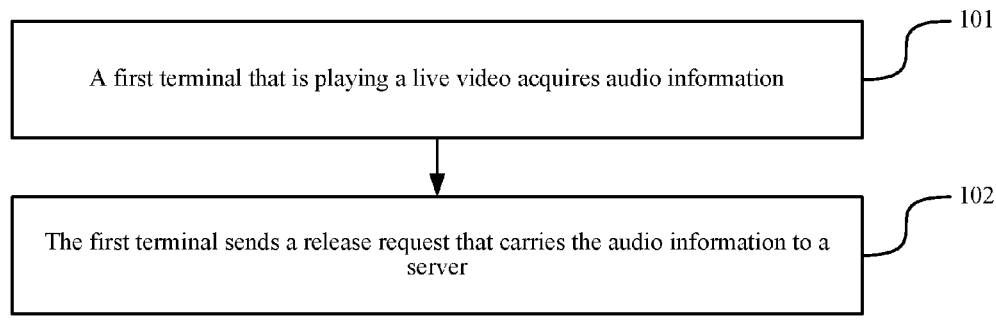
FIG. 1 is a flowchart of an information release method according to an embodiment of the present invention.

As shown in FIG. 1, a processing procedure of an information sender (such as a first terminal below) in the method may include the following processing steps.

Step 101. A first terminal that is playing a live video acquires audio information.

Step 102. The first terminal sends a release request that carries the audio information to a server.

Figure 2:
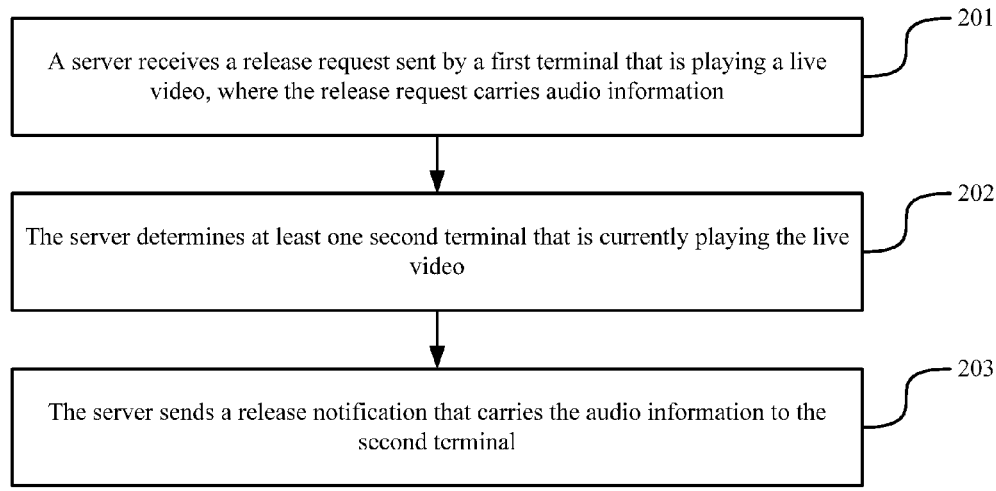
FIG. 2 is a flowchart of an information release method according to an embodiment of the present invention.

As shown in FIG. 2, a processing procedure of a server in the method may include the following processing steps.

Step 201. A server receives a release request sent by a first terminal that is playing a live video, where the release request carries audio information.

Step 202. The server determines at least one second terminal that is currently playing the live video.

Step 203. The server sends a release notification that carries the audio information to the second terminal.

Figure 3:
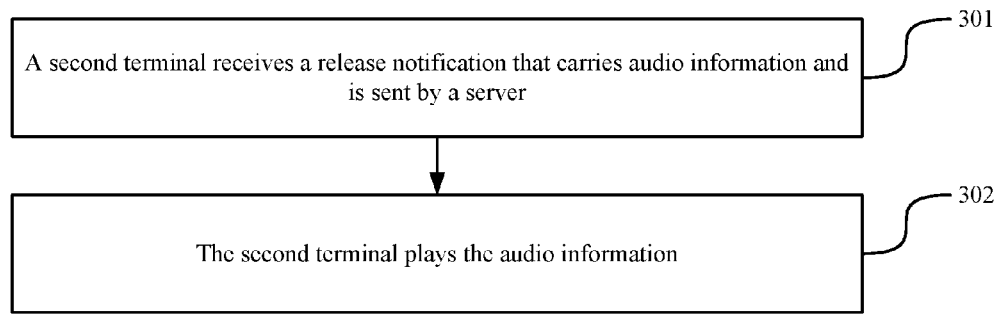
FIG. 3 is a flowchart of an information release method according to an embodiment of the present invention.

As shown in FIG. 3, a processing procedure of an information receiver (such as a second terminal below) in the method may include the following processing steps.

Step 301. A second terminal receives a release notification that carries audio information and is sent by a server.

Step 302. The second terminal plays the audio information.

In this embodiment of the present invention, a server receives a release request that carries audio information and is sent by a first terminal that is playing a live video, determines a second terminal that is currently playing the live video, and sends a release notification that carries the audio information to the second terminal; and the second terminal plays the audio information. In this way, during play of a live video, information to be released by a user can be transmitted and released in an audio playback manner, and the user does not need to move a line of sight to read text information in an information window, thereby reducing an impact on acquisition of information in the live video.

Embodiment 2

Figure 4:
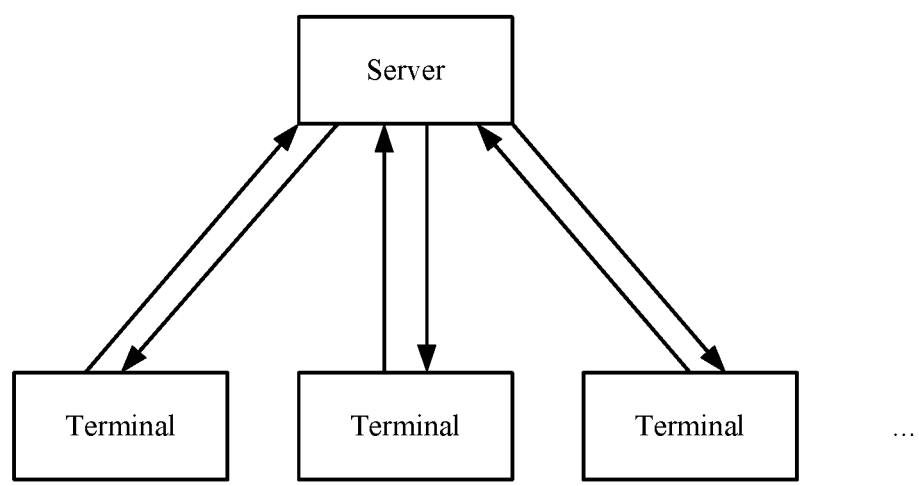
FIG. 4 is a network system architecture diagram according to an embodiment of the present invention.

An embodiment of the present invention provides an information release method, where the method may be jointly implemented by a server, an information sender, and an information receiver. The information sender may be a terminal that can play a live video, such as a first terminal described below. The information receiver may be a terminal that can play a live video, such as a second terminal described below, and there may be one or more information receivers. The server may be a backend server of an application program, which plays a live video, of a terminal. FIG. 4 is a network system architecture diagram according to an embodiment of the present invention, which includes a server and multiple terminals, where a first terminal may be any terminal thereof, and a second terminal may be any one or more terminals thereof except the first terminal. Each terminal may function as the first terminal in an information release process, and may also function as the second terminal in another information release process.

Figure 5:
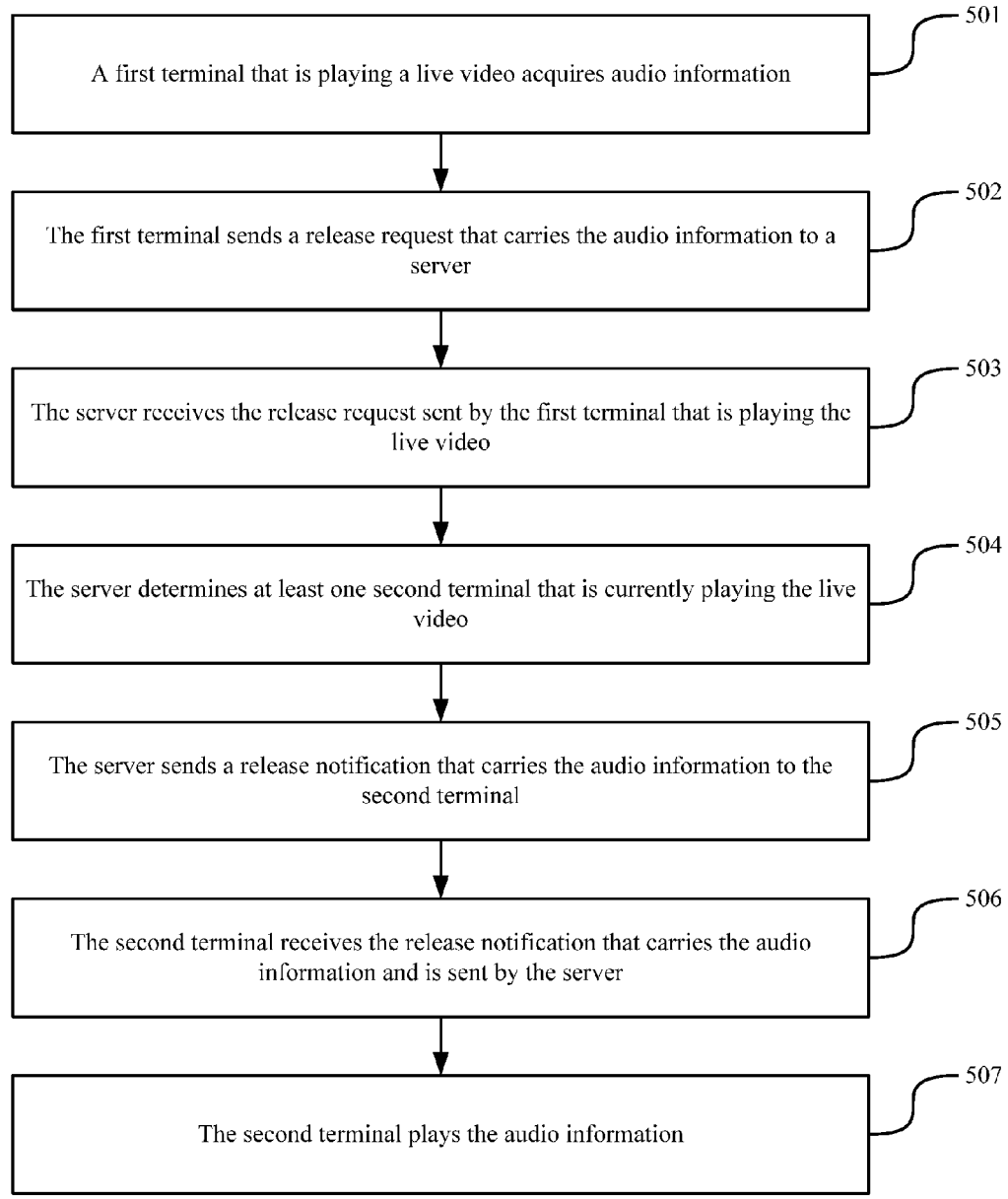
FIG. 5 is a flowchart of an information release method according to an embodiment of the present invention.

As shown in FIG. 5, a processing procedure of the method may include the following processing steps.

Step 501. A first terminal that is playing a live video acquires audio information.

The live video may be a video that is synchronously transmitted to and played on multiple terminals in a network in a specific period of time. The first terminal may be any terminal that can play a live video. The audio information may be audio information of a sound made by a user, or may be audio information obtained by converting a text input by a user, or may be locally prestored audio information selected by a user. The locally prestored audio information may include, for example, an audio recorded by the user, an audio file transmitted by the user, an audio generated by converting a text input, etc.

In an implementation, an application program that is used by a user to play a live video may be installed on the first terminal, and the user may run the application program to play a live video. When playing the live video, audio information to be uploaded may be determined in multiple manners. For example, one or more pieces of audio information, for example, sounds provided by the application program such as acclamation, crying or cheers, or various sounds recorded by the user, may be prestored locally, and the user may select one or more pieces of audio information (sounds) therefrom to be uploaded. For another example, the user may input, in a text window set by the application program, a text of information to be released, for example, "how touching it is", or "this is so beautiful", and then covert the text input by the user into audio information according to a prestored comparison library between characters and audio. For still another example, the sound made by the user may be collected by using an audio collection device (such as a microphone), to generate audio information.

For the foregoing sound collection manners, the first terminal may collect a sound made by the user when the user presses a key (such as a keyboard key) or clicks a button in the foregoing application program, for example, after clicking a keyboard key, the user starts speaking to a microphone, and the first terminal collects voice of the user until the user releases the key, and generates audio information by using the collected sound. Further, when the user is speaking, if the first terminal is using a speaker to play the sound of the live video, the first terminal may lower the volume of the speaker or mute the speaker such that the microphone may collect the user's voice clearly. Optionally, the first terminal may also automatically collect a sound made by the user, and corresponding processing is as follows: the first terminal that is playing a live video automatically collect a sound made by the user, to generate audio information. In this processing manner, a sound volume collection threshold and maximum idle duration may be preset. When a sound volume detected by the first terminal by using an audio collection device exceeds the sound volume collection threshold (for example, when the user starts speaking), sound collection is started. During collection, if it is detected that duration for which the sound volume is lower than the sound volume collection threshold is greater than the maximum idle duration, the sound collection is stopped, and then audio information is generated by using the collected sound. A user operation can be simplified in such a manner.

Step 502. The first terminal sends a release request that carries the audio information to a server.

The release request is a message used to request the server to release information to another terminal. The release request may also carry location information of the first terminal, and may further carry account information of a login account of the first terminal. The location information may be any information that can indicate a location of the terminal, such as coordinates, a region identifier, or an Internet Protocol (IP) address. The login account is an account, logged in to on the first terminal, of the foregoing application program that plays the live video. The account information may include an account identifier, a nickname, sex, age, an avatar, and the like.

In an implementation, after acquiring the audio information, the first terminal may generate a release request, add the acquired audio information to the release request, or add information such as the location information of the first terminal and/or the account information of the login account of the first terminal to the release request, and then send the release request to the server.

Preferably, in order to make another terminal better differentiate the audio information from a sound in the live video when playing the audio information, the first terminal may perform an audio adjustment on the audio information before sending the audio information. Correspondingly, processing of step 502 may be as follows. The first terminal performs a first audio adjustment on the audio information; and the first terminal sends, to the server, a release request that carries the audio information on which the first audio adjustment is performed.

The first audio adjustment may be any adjustment that can make a sound of the audio information differ from a sound of the live video. Preferably, the first audio adjustment may be an adjustment performed on an amplitude in a range of a first frequency, where the range of the first frequency may be a part of a frequency range of the audio information, and the amplitude adjustment may be an increase or a decrease. By means of such an adjustment, a timbre of the audio information can be changed, for example, decreasing an amplitude of a treble frequency band or increasing an amplitude of a bass frequency band can make the sound of audio information low and deep, and increasing the amplitude of the treble frequency band or decreasing the amplitude of the bass frequency band can make the sound of the audio information high. Alternatively, the first audio adjustment may also be a first sound volume adjustment, which can increase or decrease a sound volume.

In some embodiments, the application installed in the first terminal may provide multiple preset sound effect options, such as making the sound deeper, or making the sound higher. The user may select a desired sound effect option in a configuration interface before playing the live video or in a pop-up menu when the sound collection for the audio information is complete. The first terminal may perform the first audio adjustment according to the selected sound effect option. Further, the application may provide an interface of an equalizer for the user to configure and save a preferred sound effect. When the user is selecting a sound effect option or configuring the equalizer, the application may play a sample audio before and after applying the sound effect.

Step 503. The server receives the release request sent by the first terminal that is playing the live video.

Step 504. The server determines at least one second terminal that is currently playing the live video.

The second terminal may be any one or more terminals that are currently playing the live video.

In an implementation, for each live video provided in the foregoing application program, the server may record a terminal that is currently playing the live video, in processing of the step, the second terminal determined by the server may be all terminals that are currently playing the live video and are recorded by the server, or may be one or more terminals that satisfy a preset condition in these terminals. A corresponding processing procedure may be as follows. The server determines at least one second terminal that satisfy a preset condition associated with the first terminal and is currently playing the live video.

The related condition herein may be randomly set as required. For different related conditions, there may be different specific processing manners of determining the second terminal, and some processing manners are provided below.

Manner 1

The server determines at least one second terminal, where a login account of the second terminal and a login account of the first terminal are friends and the second terminal is currently playing the foregoing live video.

In an implementation, the server may first acquire all terminals that are playing the live video and are recorded by the server, then acquire login accounts of these terminals, select a login account from these login accounts, where the selected login account and the login account of the first terminal are friends, and use a second terminal corresponding to the selected login account as an ultimately determined second terminal.

Manner 2

The server determines at least one second terminal, where account information of a specified item of a login account of the second terminal is the same or similar as that of a specified item of a login account of the first terminal.

The account information of the specified item may be set as required, which may be, for example, age information, sex information, or constellation information.

In an implementation, the server may first acquire all terminals that are playing the live video and are recorded by the server, then acquire account information of specified items of login accounts of these terminals, for example, sex information, then select a login account from these login accounts, where the account information of the selected login account is the same as that of the login account of the first terminal (e.g., having a same sex, being in a same age range), and use a second terminal corresponding to the selected login account as an ultimately determined second terminal.

Manner 3

First, the server acquires location information of the first terminal.

In an implementation, there may be various manners for the server to acquire location information of the first terminal, which may be randomly selected as required. For example, the release request sent by the first terminal may carry the location information of the first terminal, such as an IP address or coordinates. For another example, the server may query a location server for the location information of the first terminal.

Subsequently, the server determines, according to the location information of the first terminal, a second terminal that is currently playing the live video, where the determined second terminal and the first terminal fall within a same preset region.

In an implementation, the server may divide multiple preset regions in advance according to a predetermined region division rule, for example, based on buildings, sub-district, or schools, or based on an administrative region of a certain level (such as a provincial level, a municipal level, or a county level). After acquiring the location information of the first terminal, the server may determine, according to the location information, a preset region in which the first terminal is located, and then select, in the preset region, all terminals that are currently playing the live video, that is, the second terminals. For example, if the acquired location information of the first terminal is an IP address of the first terminal, the preset region in which the first terminal is located may be determined according to the IP address, and then according to IP addresses of terminals that are playing the live video, terminals falling within the preset region in the terminals, that is, the second terminals, are selected.

In some embodiments, the application installed on the first terminal may allow the user to select a preferred manner (i.e., the preset condition associated with the first terminal) for releasing the audio information, and include the selected manner in the release request. The server may determine at least one second terminal according to the selected manner in the release request. Further, an application installed on the second terminal may allow the user to select a preferred manner for receiving the audio information (e.g., only receiving from friends or from users in a same area). That is, when the server determines one or more second terminals that satisfy the preset condition associated with the first terminal, the server may further determine whether the first terminal matches with the preferred manner selected by the determined one or more second terminals. When the server finds a match, the server may send a release notification to the matched second terminal.

Step 505. The server sends a release notification that carries the audio information to the second terminal.

The release notification is a message used by the server to instruct the terminal to release a piece of information, and the information to be released in this embodiment of the present invention may be audio information.

In an implementation, after determining the second terminal, the server may generate a release notification, add the audio information in the release request to the release notification, and send the release notification to all determined second terminals. Optionally, the server may further add some account information of the login account of the first terminal to the release notification. Correspondingly, processing of step 505 may be as follows: First, the server acquires the account information of the login account of the first terminal. Then, the server sends a release notification that carries the foregoing audio information and the account information to the second terminal. The first terminal may add the account information of the login account of the first terminal to the release request, and the server may acquire the account information from the release request. Alternatively, the server may prestore account information of each account, such as an account identifier, a nickname, sex, age, and an avatar, and may add the account identifier of the login account to the release request. The server may query, according to the account identifier, for other account information corresponding to the account identifier.

Preferably, in order to make the second terminal better differentiate the audio information from a sound in the live video when playing the audio information, the server may perform an audio adjustment on the audio information before sending the audio information. Correspondingly, processing of step 505 may be as follows: The server performs a first audio adjustment on the audio information; and the server sends, to the second terminal, a release notification that carries the audio information on which the first audio adjustment is performed.

The processing procedure is similar to the processing by the first terminal in step 502, and reference may be made to corresponding content. A difference only lies in that in step 502, the audio adjustment processing is performed by the first terminal, but in step 505, the audio adjustment processing is performed by the server.

Step 506. The second terminal receives the release notification that carries the audio information and is sent by the server.

Step 507. The second terminal plays the audio information.

In an implementation, after receiving the release notification, the second terminal may directly play audio information therein; or preferably, play the audio information in the following manner.

First, the second terminal displays, on an interface of the live video, a play icon of the audio information.

The play icon may be an icon used to be clicked to trigger playback of corresponding audio information, and may be set to a form of a button. The play icon may be preset (for example, in a bubble shape) and stored in the foregoing application program. In some embodiments, the application program may allow the user to set the attributes of the play icon, such as color, shape, transparency degree, etc. Further, different attributes may be associated with audio information released by different types of first terminal. For example, a display icon corresponding to an audio information from a friend account may be set as a green circle, and that from a stranger account may be set as a yellow square. In another example, a color of the display icon may indicate a distance between the second terminal to a first terminal that releases the audio information. A darker blue may indicate a shorter distance (e.g., terminals in a same sub-district) and a lighter blue may indicate a longer distance (e.g., terminals in a same city but not in the same sub-district).

In an implementation, the second terminal may display, in an information window of a live video interface, a play icon corresponding to the audio information. In the information window, play icons corresponding to various audio information released by the terminals may be displayed, and may be arranged in a release time sequence. In addition, corresponding release time may be displayed, and duration of the audio information may also be displayed. Alternatively, the play icon may also be displayed in a video window on the live video interface, that is, displayed at an upper layer of the live video that is being played. In one embodiment, when the live video is playing, and the user switches from an integrated mode (e.g., both the live video and the information window are shown on the screen) to a full screen mode (e.g., presenting the live video in full screen), the application program may be configured to overlay some or all of the play icons on the live video. For example, three play icons that have the most recent release time may be presented on the screen. The play icons may be located at a corner of the screen to avoid blocking meaningful contents of the live video.

Preferably, for the foregoing case in which the release notification further carries the account information of the login account of the first terminal, processing by the second terminal when displaying the play icon may be as follows: The second terminal displays the play icon of the audio information on the live video interface, and displays, corresponding to the play icon, the account information. For example, corresponding account information, such as an avatar, a nickname, sex, and age, may be displayed on the play icon or near the play icon.

Subsequently, the second terminal plays the audio information when the user selects the play icon.

In an implementation, a user can select and click a play icon from play icons that correspond to audio information released by the terminals and are displayed by the second terminal, to trigger generation of a clicking instruction. When receiving the instruction (i.e., when the user selects a play icon), the second terminal plays corresponding audio information. In this way, the user can hear a sound made by another user.

Optionally, the following processing may further be performed: when display duration of a play icon exceeds a preset duration threshold (for example, 10 seconds), the second terminal cancels display of the play icon. In this way, cancellation of display of a play icon of early released audio information can prevent spamming. In another example, when the second terminal finishes playing an audio information corresponding to a play icon, the second terminal may cancel display of the play icon (i.e., delete the play icon from the screen) or change a color of the play icon indicating that this piece is read.

Preferably, the foregoing audio adjustment processing not only may be performed by the server or the first terminal, but also may be performed by the second terminal. In addition, the second terminal not only can perform an audio adjustment on the audio information, but also can perform an audio adjustment on a live video. Correspondingly, there may be multiple processing manners for step 507, and some processing manners are provided below.

Manner 1: The second terminal plays the audio information after performing a first audio adjustment on the audio information.

The first audio adjustment in this processing manner is the same as the first audio adjustment in step 502, and reference may be made to corresponding content. In this processing manner, an audio adjustment is not performed on the live video.

Manner 2: The second terminal plays the audio information, and performs a second audio adjustment on the live video during playback of the audio information.

The second audio adjustment may be any adjustment that can make the sound of the live video differ from the sound of the audio information. Preferably, the second audio adjustment may be an adjustment performed on an amplitude in a range of a second frequency, where the range of the second frequency may be a part of a frequency range of the sound in the live video, and the amplitude adjustment may be an increase or a decrease. By means of such an adjustment, a timbre of the sound in the live video can be changed, for example, decreasing an amplitude of a treble frequency band or increasing an amplitude of a bass frequency band can make the sound of the live video low and deep, and increasing the amplitude of the treble frequency band or decreasing the amplitude of the bass frequency band can make the sound of the live video high. Alternatively, the second audio adjustment may also be a second sound volume adjustment, which can increase or decrease a sound volume. Optionally, the second sound volume adjustment may be decreasing a sound volume to 0.

In this processing manner, the audio adjustment is only performed on the live video, and it is not necessary to perform an audio adjustment on the audio information.

Manner 3: The second terminal plays the audio information after performing the first audio adjustment on the audio information, and performs a second audio adjustment on the live video during playback of the audio information.

The first audio adjustment and the second audio adjustment are different audio adjustments. If the first audio adjustment is an adjustment performed on the amplitude in the range of the first frequency, and the second audio adjustment is an adjustment performed on the amplitude in the range of the second frequency, the range of the second frequency may be a range that does not intersect the range of the first frequency, and amplitude adjustments may be both increases or both decreases. If the first audio adjustment is the first sound volume adjustment, and the second audio adjustment is the second sound volume adjustment, the second sound volume adjustment and the first sound volume adjustment may be sound volume adjustments in opposite adjustment directions, that is, one is a volume increase, and the other is a volume decrease.

In this processing manner, differentiated audio adjustments are performed on the live video and the audio information.

In this embodiment of the present invention, a server receives a release request that carries audio information and is sent by a first terminal that is playing a live video, determines a second terminal that is currently playing the live video, and sends a release notification that carries the audio information to the second terminal; and the second terminal plays the audio information. In this way, during play of a live video, information to be released by a user can be transmitted and released in an audio playback manner, and the user does not need to move a line of sight to read text information in an information window, thereby reducing an impact on acquisition of information in the live video.

Embodiment 3

Figure 6:
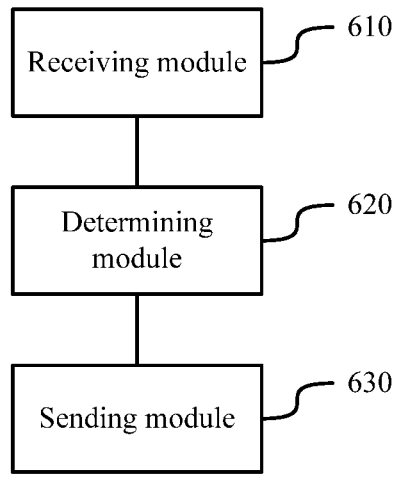
FIG. 6 is a schematic structural diagram of a server according to an embodiment of the present invention.

Based on a same technical conception, an embodiment of the present invention further provides a server. As shown in FIG. 6, the server includes: a receiving module 610, configured to receive a release request sent by a first terminal that is playing a live video, where the release request carries audio information; a determining module 620, configured to determine at least one second terminal that is currently playing the live video; and a sending module 630, configured to send a release notification that carries the audio information to the second terminal, so that the second terminal plays the audio information.

Preferably, the determining module 620 is configured to: determine at least one second terminal that satisfies a preset condition associated with the first terminal and is currently playing the live video.

Preferably, the sending module 630 is configured to: acquire account information of a login account of the first terminal; and send a release notification that carries the audio information and the account information to the second terminal.

Preferably, the sending module 630 is configured to: perform a first audio adjustment on the audio information; and send, to the second terminal, a release notification that carries the audio information on which the first audio adjustment is performed.

Preferably, the first audio adjustment includes: adjusting an amplitude in a range of a first frequency, or a first sound volume adjustment.

Figure 7:
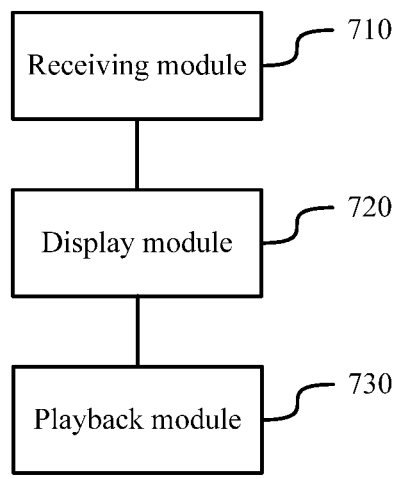
FIG. 7 is a schematic structural diagram of a second terminal according to an embodiment of the present invention.

Based on a same technical conception, an embodiment of the present invention further provides a second terminal. As shown in FIG. 7, the second terminal includes: a receiving module 710, configured to receive a release notification that carries audio information and is sent by a server; a display module 720, configured to display, on an interface of the live video, a play icon of the audio information; and a playback module 730, configured to play the audio information when receiving an instruction for clicking the play icon.

Preferably, the release notification further carries account information of a login account of the first terminal; and the playback module 730 is configured to: display, on the interface of the live video, the play icon of the audio information, and display, corresponding to the play icon, the account information.

Preferably, the playback module 730 is further configured to: cancel display of the play icon when display duration of the play icon exceeds a preset duration threshold.

Preferably, the playback module 730 is configured to: play the audio information after performing a first audio adjustment on the audio information; or play the audio information, and perform a second audio adjustment on the live video during playback of the audio information; or play the audio information after performing a first audio adjustment on the audio information, and perform a second audio adjustment on the live video during playback of the audio information, where the first audio adjustment and the second audio adjustment are different audio adjustments.

Preferably, the first audio adjustment includes: adjusting an amplitude in a range of a first frequency, or a first sound volume adjustment; and the second audio adjustment includes: adjusting an amplitude in a range of a second frequency, or a second sound volume adjustment.

Figure 8:
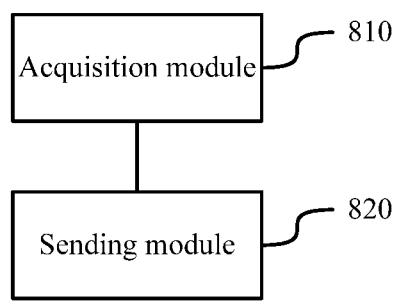
FIG. 8 is a schematic structural diagram of a first terminal according to an embodiment of the present invention.

Based on a same technical conception, an embodiment of the present invention further provides a first terminal. As shown in FIG. 8, the first terminal includes: an acquisition module 810, configured to automatically collect, when the first terminal plays a live video, a sound made by a user, to generate audio information; and a sending module 820, configured to send a release request that carries the audio information to a server, so that the server determines a second terminal that is currently playing the live video, and sends a release notification that carries the audio information to the second terminal, so that the second terminal plays the audio information.

Preferably, the sending module 820 is configured to: perform a first audio adjustment on the audio information; and send, to the server, a release request that carries the audio information on which the first audio adjustment is performed.

Preferably, the first audio adjustment includes: adjusting an amplitude in a range of a first frequency, or a first sound volume adjustment.

A sound made by a user is automatically collected when a live video is played, to generate audio information.

In this embodiment of the present invention, a server receives a release request that carries audio information and is sent by a first terminal that is playing a live video, determines a second terminal that is currently playing the live video, and sends a release notification that carries the audio information to the second terminal; and the second terminal plays the audio information. In this way, during play of a live video, information to be released by a user can be transmitted and released in an audio playback manner, and the user does not need to move a line of sight to read text information in an information window, thereby reducing an impact on acquisition of information in the live video.

Embodiment 4

Based on a same technical conception, an embodiment of the present invention further provides an information release system, where the system includes a server, a first terminal, and at least one second terminal, where: the first terminal is configured to acquire audio information when a live video is played; and send a release request that carries the audio information to the server; the server is configured to receive a release request sent by the first terminal that is playing a live video, where the release request carries audio information; determine the at least one second terminal that is currently playing the live video; and send a release notification that carries the audio information to the second terminal; and the second terminal is configured to receive the release notification that carries the audio information and is sent by the server; and play the audio information.

In this embodiment of the present invention, a server receives a release request that carries audio information and is sent by a first terminal that is playing a live video, determines a second terminal that is currently playing the live video, and sends a release notification that carries the audio information to the second terminal; and the second terminal plays the audio information. In this way, during play of a live video, information to be released by a user can be transmitted and released in an audio playback manner, and the user does not need to move a line of sight to read text information in an information window, thereby reducing an impact on acquisition of information in the live video.

Embodiment 5

Figure 9:
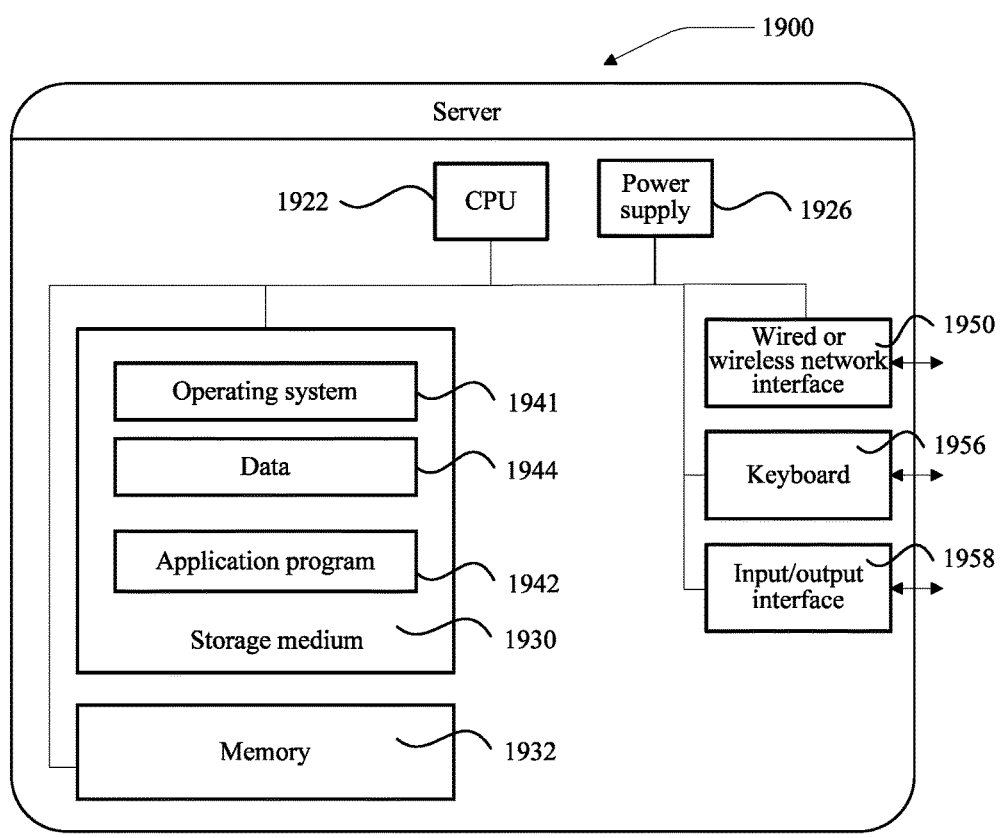
FIG. 9 is a schematic structural diagram of a server according to an embodiment of the present invention.

FIG. 9 is a schematic structural diagram of a server according to an embodiment of the present invention. The server 1900 may vary greatly due to different configurations or performance, and may include one or more central processing units (CPUs) 1922 (for example, one or more processors), a memory 1932, and one or more storage media 1930 (for example, one or more mass storage devices) that store application programs 1942 or data 1944. The memory 1932 and the storage medium 1930 may be transient or persistent storages. A program stored in the storage medium 1930 may include one or more modules (not shown in the figure), and each module may include a series of instructions and operations for the server. Furthermore, the CPU 1922 may be set to communicate with the storage medium 1930, and perform, on the server 1900, a series of instructions and operations in the storage medium 1930.

The server 1900 may further include one or more power supplies 1926, one or more wired or wireless network interfaces 1950, one or more input/output interfaces 1958, one or more keyboards 1956, and/or one or more operating systems 1941, for example, Windows Server™, Mac OS X™, Unix™, Linux™, or FreeBSD™.

The server 1900 may include a memory and one or more programs. The one or more programs are stored in the memory and configured to be executed by one or more processors. The one or more programs contain instructions used for performing the following operations: receiving a release request sent by a first terminal that is playing a live video, where the release request carries audio information; determining at least one second terminal that is currently playing the live video; and sending a release notification that carries the audio information to the second terminal.

Preferably, the determining at least one second terminal that is currently playing the live video includes: determine at least one second terminal that satisfies a preset condition associated with the first terminal and is currently playing the live video.

Preferably, the sending a release notification that carries the audio information to the second terminal includes: acquiring account information of a login account of the first terminal; and sending a release notification that carries the audio information and the account information to the second terminal.

Preferably, the sending a release notification that carries the audio information to the second terminal includes: performing a first audio adjustment on the audio information; and sending, to the second terminal, a release notification that carries the audio information on which the first audio adjustment is performed.

Preferably, the first audio adjustment includes: adjusting an amplitude in a range of a first frequency, or a first sound volume adjustment.

In this embodiment of the present invention, a server receives a release request that carries audio information and is sent by a first terminal that is playing a live video, determines a second terminal that is currently playing the live video, and sends a release notification that carries the audio information to the second terminal; and the second terminal plays the audio information. In this way, during play of a live video, information to be released by a user can be transmitted and released in an audio playback manner, and the user does not need to move a line of sight to read text information in an information window, thereby reducing an impact on acquisition of information in the live video.

Embodiment 6

Figure 10:
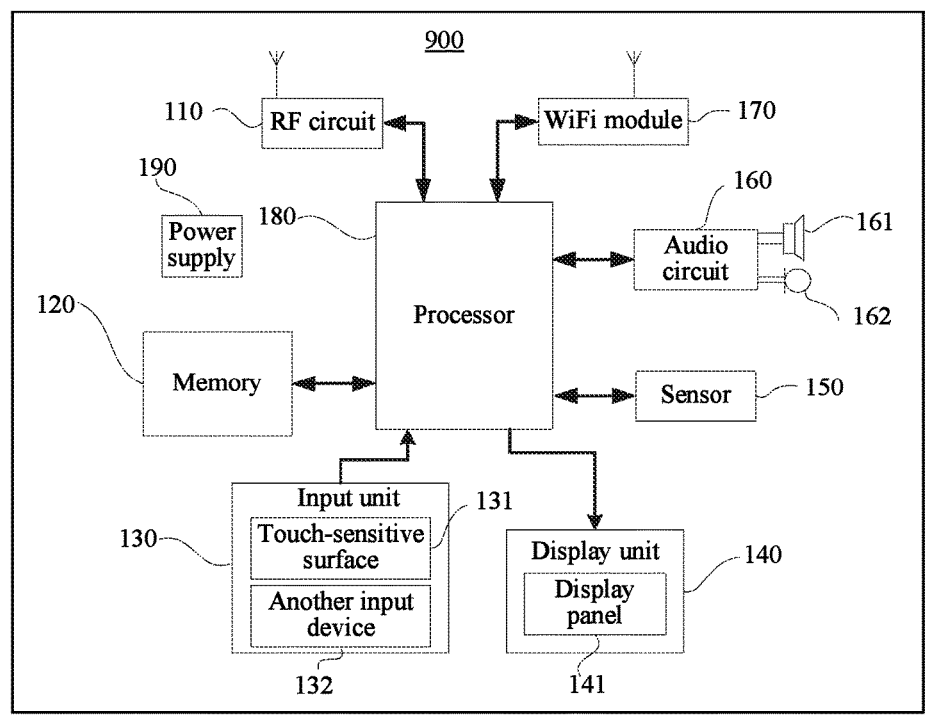
FIG. 10 is a schematic structural diagram of a terminal according to an embodiment of the present invention.

Refer to FIG. 10, which is a schematic structural diagram of a terminal that has a touch-sensitive surface and is involved in an embodiment of the present invention. The terminal may function as the first terminal or the second terminal in the foregoing embodiments, and may have functions of both the first terminal and the second terminal. The terminal is configured to implement the information release method provided in the foregoing embodiment, which is specifically as follows.

The terminal 900 may include components such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal device shown in FIG. 10 does not constitute a limitation to the terminal device, and the terminal device may include more components or fewer components than those shown in the figure, or some components may be combined, or a different component deployment may be used.

The RF circuit 110 may be configured to receive and send a signal during an information receiving and sending process or a conversation process. Specifically, the RF circuit 110 receives downlink information from a base station, then delivers the downlink information to one or more processors 180 for processing, and sends related uplink data to the base station. Generally, the RF circuit 110 includes but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high speed random access memory, and may also include a non-volatile memory, such as at least one magnetic disk storage device, a flash memory, or another volatile solid-state storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus, and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface acoustic wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 900. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock). Other sensor, such as a gyroscope, a barometer, a hygrometer, a thermometer, and an infrared sensor, which may be configured in the terminal 900 are not further described herein.

The audio circuit 160, a loudspeaker 161, and a microphone 162 may provide audio interfaces between the user and the terminal 900. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 900.

WiFi is a short distance wireless transmission technology. The terminal 900 may help, by using the WiFi module 170, a user to receive and send an e-mail, browse a webpage, and access stream media, and the like, which provides wireless broadband Internet access for the user. Although FIG. 10 shows the WiFi module 170, it may be understood that, the WiFi module 170 is not a necessary component of the terminal 900, and when required, the wireless communications unit may be omitted as long as the scope of the essence of the present disclosure is not changed.

The processor 180 is a control center of the terminal 900, and connects to various parts of the terminal by using various interfaces and lines. By running or executing the software program and/or module stored in the memory 120, and invoking data stored in the memory 120, the processor 180 performs various functions and data processing of the terminal 900, thereby performing overall monitoring on the terminal. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may also not be integrated into the processor 180.

The terminal 900 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal 900 may further include a camera, a Bluetooth module, and the like, which are not further described herein. Specifically, in this embodiment, the display unit of the terminal 900 is a touch screen display, and the terminal 900 further includes a memory and one or more programs. The one or more programs are stored in the memory and configured to be executed by one or more processors. The foregoing one or more programs contain instructions used for implementing the following operations: receiving a release notification that carries audio information and is sent by a server; displaying, on an interface of the live video, a play icon of the audio information; and playing the audio information when receiving an instruction for clicking the play icon.

Preferably, the release notification further carries account information of a login account of the first terminal; and the displaying, on an interface of the live video, a play icon of the audio information includes: displaying, on the interface of the live video, the play icon of the audio information, and displaying, corresponding to the play icon, the account information.

Preferably, the operations further include: cancelling display of the play icon when display duration of the play icon exceeds a preset duration threshold.

Preferably, the playing the audio information includes: playing the audio information after performing a first audio adjustment on the audio information; or playing the audio information, and performing a second audio adjustment on the live video during playback of the audio information; or playing the audio information after performing a first audio adjustment on the audio information, and performing a second audio adjustment on the live video during playback of the audio information, where the first audio adjustment and the second audio adjustment are different audio adjustments.

Preferably, the first audio adjustment includes: adjusting an amplitude in a range of a first frequency, or a first sound volume adjustment; and the second audio adjustment includes: adjusting an amplitude in a range of a second frequency, or a second sound volume adjustment.

The foregoing one or more programs may also contain instructions used for implementing the following operations: automatically collecting, when a live video is played, a sound made by a user, to generate audio information; and sending a release request that carries the audio information to a server.

Preferably, the sending a release request that carries the audio information to a server includes: performing a first audio adjustment on the audio information; and sending, to the server, a release request that carries the audio information on which the first audio adjustment is performed.

Preferably, the first audio adjustment includes: adjusting an amplitude in a range of a first frequency, or a first sound volume adjustment.

In this embodiment of the present invention, a server receives a release request that carries audio information and is sent by a first terminal that is playing a live video, determines a second terminal that is currently playing the live video, and sends a release notification that carries the audio information to the second terminal; and the second terminal plays the audio information. In this way, during play of a live video, information to be released by a user can be transmitted and released in an audio playback manner, and the user does not need to move a line of sight to read text information in an information window, thereby reducing an impact on acquisition of information in the live video.

It should be noted that: when the information release apparatus provided in the foregoing embodiment releases information, description is only made by using an example of division of the foregoing functional modules. In an actual application, the foregoing functions may be allocated to different functional modules as required for implementation, that is, an internal structure of the apparatus is divided into different functional modules, so as to complete all or a part of functions described above. In addition, the information release apparatus provided in the foregoing embodiment and the embodiment of the information release method belong to a same conception. For a specific implementation process of the apparatus, refer to the method embodiment for detail, and details are not described herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An information release method, comprising:
receiving, by a server, a release request sent by a first terminal that is playing a live video, the release request carrying an audio information, wherein the audio information is selected by a user from a plurality of prestored audio information prestored in the first terminal;
determining, by the server, at least one second terminal that is currently playing the live video;
sending, by the server, a release notification that carries the audio information to the at least one second terminal;
receiving, by the at least one second terminal, the release notification that carries the audio information and is sent by the server;
displaying, by the at least one second terminal on an interface of the live video, a play icon of the audio information; and
when the play icon is selected, playing, by the at least one second terminal, the audio information after performing a first audio adjustment on the audio information, and performing a second audio adjustment on the live video during playback of the audio information, wherein the first audio adjustment and the second audio adjustment are different audio adjustments; wherein the first audio adjustment comprises at least one of: adjusting an amplitude in a range of a first frequency, and making a first sound volume adjustment, and the second audio adjustment comprises at least one of: adjusting an amplitude in a range of a second frequency, and making a second sound volume adjustment.

2. The information release method according to claim 1, wherein determining, by the server, at least one second terminal that is currently playing the live video comprises:
determining, by the server, the at least one second terminal that satisfies a preset condition associated with the first terminal and is currently playing the live video.

3. The information release method according to claim 1, wherein sending, by the server, a release notification that carries the audio information to the second terminal comprises:
performing, by the server, a first audio adjustment on the audio information; and
sending, by the server to the second terminal, the release notification that carries the audio information on which the first audio adjustment is performed.

4. The information release method according to claim 1, wherein the release notification further carries account information of a login account of the first terminal; and
displaying, by the at least one second terminal on an interface of the live video, a play icon of the audio information comprises:
displaying, by the at least one second terminal on the interface of the live video, the play icon of the audio information, and displaying, corresponding to the play icon, the account information.

5. The information release method according to claim 1, wherein the method further comprises:
cancelling, by the at least one second terminal, display of the play icon when display duration of the play icon exceeds a preset duration threshold.

6. The information release method according to claim 1, wherein the playing, by the at least one second terminal, the audio information comprises:
playing, by the at least one second terminal, the audio information after performing a first audio adjustment on the audio information; or playing, by the at least one second terminal, the audio information, and performing a second audio adjustment on the live video during playback of the audio information.

7. The information release method according to claim 1, further comprising:
collecting, by the first terminal, a sound made by the user, to generate the plurality of prestored audio information, and prestoring the plurality of prestored audio information in the first terminal.

8. The information release method according to claim 1, wherein the release request further carries a location information of the first terminal.

9. The information release method according to claim 1, wherein performing the first audio adjustment on the audio information comprises:
changing a timbre of the audio information.

10. The information release method according to claim 9, wherein performing the first audio adjustment on the audio information comprises:
decreasing the amplitude of a treble frequency band of the first frequency or increasing the amplitude of a bass frequency band of the first frequency.

11. A server, comprising:
at least one processor;
a memory coupled to the at least one processor; and
a plurality of program modules stored in the memory to be executed by the at least one processor, the plurality of program modules including:
a receiving module, configured to receive a release request sent by a first terminal that is playing a live video, the release request carrying an audio information, wherein the audio information is selected by a user from a plurality of prestored audio information prestored in the first terminal;
a determining module, configured to determine at least one second terminal that is currently playing the live video; and
a sending module, configured to perform a first audio adjustment on the audio information, send a release notification that carries the audio information on which the first audio adjustment is performed to the at least one second terminal, and perform a second audio adjustment on the live video during playback of the audio information; wherein the first audio adjustment comprises at least one of: adjusting an amplitude in a range of a first frequency, and making a first sound volume adjustment, and the second audio adjustment comprises at least one of: adjusting an amplitude in a range of a second frequency, and making a second sound volume adjustment.

12. The server according to claim 11, wherein the determining module is configured to:
determine the at least one second terminal that satisfies a preset condition associated with the first terminal and is currently playing the live video.

13. The server according to claim 11, wherein the sending module is further configured to change a timbre of the audio information.

14. The server according to claim 13, wherein the sending module is further configured to decrease the amplitude of a treble frequency band of the first frequency or increase the amplitude of a bass frequency band of the first frequency.

15. A terminal, comprising:
at least one processor;
a memory coupled to the at least one processor; and
a plurality of program modules stored in the memory to be executed by the at least one processor, the plurality of program modules including:
a receiving module, configured to receive a release notification that carries audio information and is sent by a server, wherein the audio information is selected by a user from a plurality of prestored audio information;
a display module, configured to display on an interface of the live video, a play icon of the audio information; and
a playback module, configured to perform a first audio adjustment on the audio information and play the audio information when receiving the play icon is selected, and configured to perform a second audio adjustment on the live video during playback of the audio information, wherein the first audio adjustment and the second audio adjustment are different audio adjustments; wherein the first audio adjustment comprises at least one of: adjusting an amplitude in a range of a first frequency, and making a first sound volume adjustment, and the second audio adjustment comprises at least one of: adjusting an amplitude in a range of a second frequency, and making a second sound volume adjustment.

16. The terminal according to claim 15, wherein the release notification further carries account information of a login account of the first terminal; and
the playback module is configured to:
display, on the interface of the live video, the play icon of the audio information, and display, corresponding to the play icon, the account information.

17. The terminal according to claim 15, wherein the playback module is further configured to:
cancel, when display duration of the play icon exceeds a preset duration threshold, display of the play icon.

18. The terminal according to claim 15, further comprising:
an acquisition module, configured to collect a sound made by the user, to generate the plurality of prestored audio information; and
a sending module, configured to send a release request that carries the audio information to the server.

19. The terminal according to claim 18, wherein the sending module is configured to:
send, to the server, the release request that carries the audio information on which the first audio adjustment is performed.

20. The terminal according to claim 15, wherein the playback module is further configured to decrease the amplitude of a treble frequency band of the first frequency or increase the amplitude of a bass frequency band of the first frequency.

* * * * *